United States Patent [19]
Friedrich et al.

[11] 3,855,078
[45] Dec. 17, 1974

[54] SEPARATION OF MIXTURES OF VINYL ACETATE AND METHANOL CONTAINING MINOR AMOUNTS OF METHYL ACETATE AND ACETALDEHYDE BY EXTRACTION DISTILLATION WITH AN AROMATIC HYDROCARBON

[75] Inventors: Gerhard Friedrich; Gunter Heck, both of Diedenbergen/Taunus; Adolf Schmidt, Hofheim/Taunus, all of Germany

[73] Assignee: Farbwerke Hoechst Aktiengesellschaft Vormals Meister Lucius & Bruning, Frankfurt/Main, Germany

[22] Filed: Oct. 23, 1973

[21] Appl. No.: 408,645

[30] Foreign Application Priority Data
Oct. 25, 1972  Germany............................ 2252276
Aug. 21, 1973  Germany............................ 2342144

[52] U.S. Cl............... 203/37, 203/57, 203/59, 203/67, 203/69, 203/56, 203/DIG. 10, 260/499
[51] Int. Cl........................ B01d 3/40, C07c 67/06
[58] Field of Search ............ 203/69, 67, 63, 59, 60, 203/57, 37, 56, 82, 84, DIG. 10; 260/499

[56] References Cited
UNITED STATES PATENTS
2,349,807  5/1944   Benedict............................ 260/499
2,575,244  11/1951  Carloon et al....................... 203/37
2,622,060  12/1952  Robeson............................. 203/37
3,350,417  10/1967  Binning et al....................... 203/37
3,691,021  9/1972   Feldman et al...................... 260/499
3,636,087  1/1972   Cuserio............................. 260/499
3,551,299  12/1970  Defazio et al...................... 203/69
3,616,271  10/1971  Copelin............................. 203/69

OTHER PUBLICATIONS
Weissberger, Technique of Organic Chemistry, Vol. IV, Distillation–Interscience Publ., 1951, N.Y., pg. 325, 338 & 339.

Primary Examiner—Wilbur L. Bascomb, Jr.
Attorney, Agent, or Firm—Curtis, Morris & Safford

[57] ABSTRACT

A process for the separation of mixtures of vinyl acetate and methanol containing minor amounts of impurities is provided. Vinyl acetate is separated from the mixture by extractive distillation with a benzene or napthalene hydrocarbon derivative whereas methanol is recovered from the overhead product by distillation.

6 Claims, 1 Drawing Figure

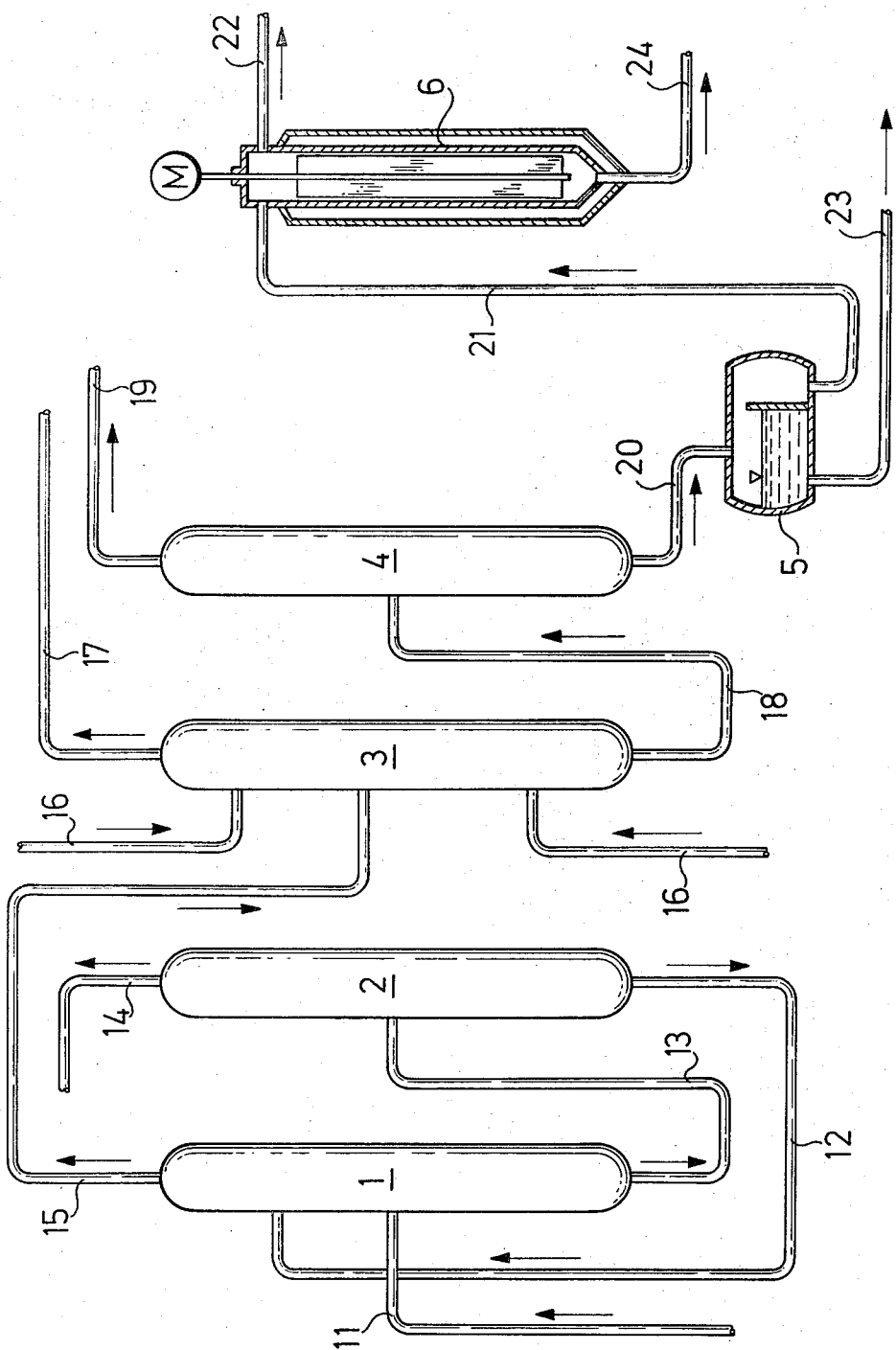

SEPARATION OF MIXTURES OF VINYL ACETATE AND METHANOL CONTAINING MINOR AMOUNTS OF METHYL ACETATE AND ACETALDEHYDE BY EXTRACTION DISTILLATION WITH AN AROMATIC HYDROCARBON

The present invention relates to a process for separating by extractive distillation mixtures consisting essentially of vinyl acetate and methanol and containing minor amounts of methyl acetate and acetaldehyde as impurities.

In the polymerization of vinyl acetate in methanolic solution a mixture containing monomeric vinyl acetate, methanol and, as a result of secondary reactions, methyl acetate and acetaldehyde is obtained. It is known that vinyl acetate and methanol form an azeotropic mixture.

It has been proposed to separate mixtures of this kind by extractive distillation using water or ethylene glycol as extracting agent. In both cases the vinyl acetate is obtained as over-head product together with methyl acetate and acetaldehyde, while methanol and extracting agent form the bottom product. During the course of the distillation secondary reactions take place, vinyl acetate reacts with water to give acetic acid and acetaldehyde and with ethylene glycol it forms glycol acetate and acetaldehyde.

Hence, when the aforesaid extracting agents are used losses of vinyl acetate occur which are undesirable for economic reasons, and when ethylene glycol is used an additional regeneration step is required because of the formation of glycol acetate.

The use of water and ethylene glycol as extracting agents has the further disadvantage that in a column subsequent to the extractive distillation acetaldehyde and methyl acetate must be separated from vinyl acetate obtained as sump product. The vinyl acetate recovered in this manner can only be used for the manufacture of polymers of relatively low molecular weight as it always contains a small amount of acetaldehyde, especially in the presence of small amounts of methanol, and further contains an inhibitor added to avoid the formation of polymer deposits in the evaporation columns.

The present invention provides a process for separating by extractive distillation mixtures consisting essentially of vinyl acetate and methanol and containing minor amounts of methyl acetate and acetaldehyde as impurities, in which process the vinyl acetate and the methanol are obtained free from aldehydes and inhibitors. The mixture of vinyl acetate, methanol, methyl acetate and acetaldehyde, which may also contain small amounts of water, is separated in a first stage into an overhead product composed of methanol, methyl acetate, acetaldehyde, and small amounts of extracting agent, vinyl acetate and water, if any, and a bottom product consisting of extracting agent and vinyl acetate, the extracting agent being a benzene or naphthalene hydrocarbon or a derivative thereof boiling at a temperature above 100°C. In a second stage the bottom product is distilled to yield vinyl acetate as overhead product and the extracting agent as bottom product.

In this manner very pure vinyl acetate is obtained which is especially free from aldehydes and inhibitors and can thus be used for the manufacture of polyvinyl acetate of high molecular weight.

Suitable extracting agents are benzene and naphthalene derivatives which are liquid at room temperature and boil at a temperature above 100°C and are composed exclusively of carbon and hydrogen atoms, for example 1,2,4-trimethylbenzene, 1,3,5-trimethylbenzene, isopropylbenzene, α-methylstyrene, sec. butylbenzene, tert. butylbenzene, diethylbenzene, 1-methyl-4-isopropylbenzene, 5-tert. butyl-m-xylene, cyclohexylbenzene, 1-methylnaphthalene and tetrahydronaphthalene.

Furthermore there may be used as extracting agents derivatives of benzene and naphthalene hydrocarbons which are liquid at room temperature and have a boiling point above 100°C at atmospheric pressure and are substituted in the nucleus at least once by a halogen atom, a halogenoalkyl, alkoxy or dialkylamino group having of from one to four carbon atoms in the alkyl or alkoxy radical, a cyano or nitro group. There may be mentioned, for example, chlorobenzene, o-dichlorobenzene, 4-chlorotoluene, 3,4-dichlorotoluene, bromobenzene, m-chlorotrifluoromethylbenzene, benzonitrile, nitrobenzene, 1-chloronaphthalene, anisole, or N,N-dimethylaniline. Especially good results are obtained with 1,2,4-trimethylbenzene, chlorobenzene, o-dichlorobenzene and nitrobenzene.

In order to prevent the vinyl acetate from polymerizing in the extraction column or the vinyl acetate distillation column a polymerization inhibitor should be added to the extracting agent. Said inhibitor should be soluble in the extracting agent and have such a low vapor pressure that it does not pass into the overhead product in the distillative separation of vinyl acetate and extracting agent. Phenothiazine has proved especially suitable.

The overhead product of the extraction column is passed into a distillation column where it is decomposed, with the addition of methanolic sodium hydroxide solution, to yield an overhead product consisting of acetaldehyde, methyl acetate and a small amount of methanol, and a bottom product containing the main quantity of methanol, water, if any, sodium hydroxide and extracting agent. By distillation of the bottom product pure methanol which is practically free from aldehyde is obtained.

In the following Table I the separation factors are compiled for a methanol/vinyl acetate mixture using various extracting agents.

TABLE 1

| Extracting agent | separation factor |
|---|---|
| 1,2,4-trimethylbenzene | 3.0 |
| 1,3,5-trimethylbenzene | 3.4 |
| iso-propylbenzene | 3.9 |
| α-methylstyrene | 3.5 |
| sec.-butylbenzene | 2.8 |
| tert.-butylbenzene | 3.4 |
| diethylbenzene | 2.8 |
| 1-methyl-4-iso-propylbenzene | 2.7 |
| 5-tert.-butyl-m-xylene | 2.9 |
| cyclohexylbenzene | 2.9 |
| 1-methylnaphthalene | 3.1 |
| tetrahydronaphthalene | 3.9 |
| chlorobenzene | 3.1 |
| 4-chlorotoluene | 2.7 |
| 3.4-dichlorotoluene | 2.4 |
| m-chloro-trifluoromethylbenzene | 3.3 |
| bromobenzene | 2.7 |
| benzonitrile | 1.9 |
| nitrobenzene | 2.5 |
| 1-chloronaphthalene | 2.4 |
| anisole | 2.4 |

TABLE 1-Continued

| Extracting agent | separation factor |
| --- | --- |
| N,N-dimethylaniline | 1.8 |
| without extracting agent | 0.8 |

The separation factors listed in the above table were determined in a circulation apparatus according to Rock and Sieg (Zeitschrift fur physikalische Chemie, NF 3, page 355 (1955)) with a mixture consisting of 45 percent by weight of vinyl acetate, 52 percent by weight of methanol, 1 percent by weight of acetaldehyde and 2 percent by weight of methyl acetate. The proportion by volume of extracting agent to methanol/vinyl acetate mixture was 4 : 1.

The process of the invention will now be described in further detail with reference to the accompanying drawing representing a flow scheme of a plant designed to carry out the separation of vinyl acetate and methanol. In the drawing vina means vinyl acetate and the abbreviation ext. stands for extracting agent.

Column 1 is fed through conduit 11 with the starting mixture of vinyl acetate, methanol, methyl acetate and acetaldehyde, which may contain small amounts of water, and above the feeding point the extracting agent containing the inhibitor is added through conduit 12. The bottom product consisting of extracting agent and vinyl acetate in which the inhibitor is dissolved is passed through conduit 13 into column 2, where it is separated into pure vinyl acetate as overhead product (14) and extracting agent and inhibitor as bottom product. The bottom product is recycled into column 1. The overhead product of column 1 which, in addition to methanol, methyl acetate and acetaldehyde, may contain water, small amounts of extracting agent and vinyl acetate, is transported through conduit 15 into column 3, where it is distilled with the addition of methanolic sodium hydroxide solution added through conduit 16.

In this distillation column acetaldehyde and methyl acetate together with a small amount of methanol are recovered as the overhead product (17). Small amounts of vinyl acetate are reacted with methanol is yield methyl acetate and acetaldehyde. The bottom product of column 3 contains the main quantity of methanol, water, if any, sodium hydroxide and extracting agent. Through conduit 18 the bottom product is transferred to column 4 where it is separated to pure methanol as overhead product (19) and a small amount of bottom product (20) containing residual methanol, water, sodium hydroxide and extracting agent. This mixture is separated in a separator 5. The extracting agent passes through conduit 21 into evaporator 6. The recovered extracting agent from evaporator 6 is recycled into column 1 through conduit 22.

The residue consisting of water, methanol and sodium hydroxide, which is obtained in separator 5, is passed via conduit 23 into the waste water purification system. The bottom product of column 6, containing small amounts of extracting agent and resinous by-products, which may have formed, is passed through conduit 24 into a combustion device.

The following examples illustrate the invention.

EXAMPLE 1

This example refers to a test run on columns 1, 2, and 3 only.

The mixture to be separated had the following composition:

| | |
| --- | --- |
| vinyl acetate | 54.5 % by weight |
| methanol | 43.2 % by weight |
| acetaldehyde | 0.5 % by weight |
| methyl acetate | 1.7 % by weight |
| water | 0.1 % by weight |

Column 1 was a bubble cap plate column having a length of 350 cm and an inside diameter of 5 cm which contained 50 plates.

At a feeding temperature of 50°C, 200 g/h of the above mixture were fed to the 10th plate and simultaneously 840 g/h of 1,2,4- trimethylbenzene at 65°C were fed on the 35th plate.

In a steady state the temperature was 63.7°C at the column head 84°C above the 3rd plate, and 121°C in the reboiler. The ratio of reflux to discharge was 1 : 1. From the reboiler, 949 g per hour of a mixture of 1,2,4-trimethyl-benzene and vinyl acetate were removed and transferred into column 2 in which 109 g/h of pure vinyl acetate were obtained as overhead product. The vinyl acetate contained less than 0.02 percent of acetaldehyde.

Column 2 having a length of 180 cm and an inside diameter of 5 cm was provided with 25 plates. The mixture of extracting agent and vinyl acetate having a temperature of 83°C entered on the 15th plate. The temperature above the 10th plate was 140°C, in the reboiler it was 169.5°C and the temperature at the head of the column was 72.5°C, the ratio of reflux to discharge being 2 : 1.

Column 3 having a length of 350 cm and an inside diameter of 5 cm was provided with 50 plates. It was operated in the laboratory independent of the other two columns. The mixture used corresponded to the overhead product of column 1, it consisted of 95.8 percent of methanol, 1.0 percent of acetaldehyde, 2.0 percent of methyl acetate, 0.5 percent of vinyl acetate, 0.2 percent of water and 0.5 percent of 1,2,4-trimethylbenzene. 390 ml/h of this mixture were pumped at a temperature of 50°C on the 40th plate of column 3. Simultaneously, 8 ml/h each of 2.5 percent methanolic sodium hydroxide solution were supplied on the 10th and 50th plate. The ratio of reflux to discharge was 70 : 1. The temperature at the head of the column was 55°C, the reboiler temperature was 66°C. As overhead product a mixture was obtained in an amount corresponding to 5 to 7 percent of the feed mixture and containing, in addition to small amounts of methanol, the total amount of methyl acetate and acetaldehyde. By distillation of the bottom product methanol containing less than 20ppm of acetaldehyde was obtained.

EXAMPLE 2

This example refers to a test run on columns 1 and 2 only. The mixture to be separated had the following composition:

| | |
| --- | --- |
| vinyl acetate | 45.0 % by weight |
| methanol | 52.0 % by weight |

-Continued

| | |
|---|---|
| acetaldehyde | 1.0 % by weight |
| methyl acetate | 2.0 % by weight |

As colum 1 a bubble cap plate column having a length of 350 cm and an inside diameter of 5 cm provided with 50 plates was used.

200 g/h of the mixture were fed at a temperature of 50°C on the 10th plate. Simultaneously, 1,100 g/h of nitrobenzene of 65°C were supplied on the 50th plate. In the steady state the temperature was 63.8°C at the head of the column, 87°C above the 3rd and 151°C in the reboiler. The ratio of reflux to discharge was 1 : 1. From the reboiler 1,190 g/h of a mixture of nitrobenzene and vinyl acetate were withdrawn and fed to column 2 from which 90 g/h of pure vinyl acetate were obtained as overhead product.

Column 2 had a length of 180 cm and an inside diameter of 5 cm and was provided with 20 plates. The mixture of extracting agent and vinyl acetate was supplied on the 10th plate at a temperature of 83°C. In the steady state the temperature was 211°C in the reboiler and 72.5°C at the head of the column, the ratio of reflux to discharge being 3 : 1.

EXAMPLE 3

This example refers to a test run on columns 1 and 2 only. The mixture to be separated had the following composition:

| | |
|---|---|
| vinyl acetate | 45.0 % by weight |
| methanol | 52.0 % by weight |
| acetaldehyde | 1.0 % by weight |
| methyl acetate | 2.0 % by weight. |

As column 1 a bubble cap plate column having a length of 350 cm and an inside diameter of 5 cm provided with 50 plates was used.

200 g/h of the mixture were fed at a temperature of 50°C on the 10th plate. Simultaneously, 1,014 g/h of chlorobenzene of 70°C were supplied on the 35th plate. In the stationary state the temperature was 63.7°C at the head of the column, 90°C above the 3rd plate and 120°C in the reboiler. The ratio of reflux to discharge was 1 : 1. From the reboiler 1,100 g/h of a mixture of chlorobenzene and vinyl acetate were withdrawn and fed to column 2 from which 90 g/h of pure vinyl acetate were obtained as overhead product.

Column 2 had a length of 180 cm and an inside diameter of 5 cm and was provided with 20 plates. The mixture of extracting agent and vinyl acetate was fed on the 10th plate at a temperature of 83°C. In the stationary state the temperature was 123°C above the 5th plate, 133°C in the reboiler and 72.7°C at the head of the column, the ratio of reflux to discharge being 3 : 1.

EXAMPLE 4

This example refers to a test run on columns 1 and 2 only. The mixture to be separated had the following composition:

| | |
|---|---|
| vinyl acetate | 39.04 % by weight |
| methanol | 56.50 % by weight |
| acetaldehyde | 1.59 % by weight |
| methyl acetate | 2.87 % by weight |

Column 1 was a bubble cap plate column having a length of 350 cm and an inside diameter of 5 cm provided with 50 plates.

202.5 g/h of the mixture were fed at a temperature of 50°C on the 10th plate. Simultaneously, 1,246 g/h of a o-dichlorobenzene of 60°C were supplied on the 35th plate. In the stationary state the temperature was 64.2°C at the head of the column, and 85.5°C above the 3rd plate. The ratio of reflux to discharge was 1 : 3. As overhead product of column 1 a mixture consisting of 93.95 % by weight of methanol
3.30 % by weight of methyl acetate
2.65 % by weight of acetaldehyde and
0.10 % by weight of vinyl acetate was obtained, which contained less than 1 ppm of extracting agent.

From the reboiler 1,327 g/h of a mixture of 93.91 percent by weight of o-dichlorobenzene, 5.96 percent by weight of vinyl acetate and 0.13 percent by weight of methyl acetate were discharged and fed to column 2, from which 80.8 g/h of a mixture of 97.80 percent by weight of vinyl acetate and 2.20 percent by weight of methyl acetate were obtained as overhead product.

Column 2 having a length of 180 cm and an inside diameter of 5 cm was provided with 20 plates. The mixture of extracting agent and vinyl acetate was fed to the 10th plate at a temperature of 72°C. The temperature in the reboiler was 179°C, at the head of the column it was 72.8°C, the ratio of reflux to discharge was 3 : 1.

What is claimed is:

1. A process for separating by extractive distillation a mixture which is largely composed of vinyl acetate and methanol and contains minor amounts of methyl acetate and acetaldehyde as impurities and which may contain a small amount of water, which process comprises fractionally distilling said mixture in a first stage in the presence of an extracting agent to produce an overhead product largely composed of methanol, methyl acetate, acetaldehyde, small amounts of extracting agent and vinyl acetate and a small amount of water if present in the mixture, and a bottom product largely composed of extracting agent and vinyl acetate, said extracting agent being an aromatic hydrocarbon having an atmospheric pressure boiling point above 100°C., and fractionally distilling the bottom product of said first stage distillation in a second stage to produce vinyl acetate as an overhead product and the extracting agent as a bottom product.

2. The process of claim 1, wherein the extracting agent is 1,3,5-trimethylbenzene, isopropylbenzene, α-methylstyrene, sec. butylbenzene, tert. butylbenzene, diethylbenzene, 1-methyl-4-iso-propylbenzene, 5-tert. butyl-m-xylene, cyclohexylbenzene, 1-methylnaphthalene, or tetrahydronaphthalene.

3. The process of claim 1, wherein the extracting agent is 1,2,4-trimethylbenzene.

4. A process for separating by extractive distillation a mixture which is largely composed of vinyl acetate and methanol and contains minor amounts of methyl acetate and acetaldehyde as impurities and which may contain a small amount of water, which process comprises fractionally distilling said mixture in a first stage in the presence of an extracting agent to produce an overhead product largely composed of methanol, methyl acetate, acetaldehyde, small amounts of extracting agent and vinyl acetate and a small amount of water if present in the mixture, and a bottom product largely composed of extracting agent and vinyl acetate, said extracting agent having an atmospheric pressure boiling point above 100°C. and being benzene or naphthalene substituted by one or more substituents selected from alkyl, halogen, haloalkyl, alkoxy or dialkylamino wherein the alkyl or alkoxy radicals have from one to four carbon atoms or cyano or nitro, and fractionally distilling the bottom product of said first stage distillation in a second stage to produce vinyl acetate as an overhead product and the extracting agent as a bottom product.

5. The process of claim 1, wherein the extracting agent is chlorobenzene, o-dichlorobenzene, 4-chlorotoluene, 3,4-dichloro-toluene, m-chlorotrifluoromethylbenzene, bromobenzene, benzonitrile, nitrobenzene, 1-chloronaphthalene, anisole, or N,N-dimethylaniline.

6. The process of claim 1, wherein the overhead product of the extractive distillation is separated by distillation with the addition of methanolic sodium hydroxide solution into an overhead product consisting of acetaldehyde, methyl acetate and a small amount of methanol, and a bottom product containing the main quantity of methanol, water, if any, sodium hydroxide and extracting agent, and recovering the methanol from said bottom product by distillation.

* * * * *